Patented Jan. 2, 1945

2,366,473

UNITED STATES PATENT OFFICE 2,366,473

GLASS BATCH

George J. Bair, Pittsburgh, Pa., assignor to Norbert S. Garbisch, Butler, Pa.

No Drawing. Application March 29, 1941,
Serial No. 385,861

13 Claims. (Cl. 106—52)

The present invention relates to the preparation of glass batch from materials, such as, sand or silica and fluxes such as, soda ash, lime, and the like, and it particularly relates to the formation of glass batch by the agglomeration of the raw materials of such batch into bodies of appropriate size for feeding into glass tanks or pots, each body containing within itself all of the constituents of the batch in desired proportion.

One object of the invention is, physically to combine the materials of a glass batch in such form that they can be fed to tanks or pots without release of objectionable dust.

A second object is to provide a form of glass batch of shape and size particularly suitable for the feeding operations.

A third object is to provide glass batch and mixtures in such form that they will readily melt down into a fluid mass of high degree of uniformity particularly adapted for the formation of glass, free or relatively free, of ream, stria and other imperfections.

These and other objections of the invention will be apparent from consideration of the following specifications and the appended claims.

In the manufacture of glass, at least of the common forms of glass, ingredients such as, ordinary sand admixed with suitable fluxes such as lime, soda ash, boric acid, borax and the like, are introduced into a heat resistant or refractory pot or tank in which they are melted by application of intense heat into a relatively uniform fluid mass capable of being drawn, cast, or blown into bodies of appropriate form. The mixing operation may be performed in any convenient manner: for example, by tumbling them in a rotating drum or barrel for a period of a few minutes. The mixture, commonly, is discharged by cars or by a conveyor belt into the container for melting.

Such process is objectionable for a variety of reasons. For example, the glass batch usually contains considerable percentage of dust-like components which create a dust nuisance in the atmosphere of the mixing room, and also tend to clog up the flues and checkerwork of the furnace system. This dust nuisance can, in part, be eliminated by addition of a small amount of water to the batch material during the mixing operation. In this way, dissemination of dust into the atmosphere is reduced or overcome. However, the moist materials tend quickly to dry out in the melting furnace, and dust may be caught up by the draft and carried into the flues and checkerwork.

Further difficulty in the use of conventional glass batches has been occasioned by the tendency of the lighter constituents to segregate during storage, or transportation, prior to introducing them into the furnace. When batch so segregates, non-uniformity of the melt results, and may produce stria, ream and other defects which often appeared as flaws in containers, sheets of glass, and like prepared from the melt.

In order to reduce such difficulty to a minimum, it has been common practice to screen out the fines from glass batch materials. It has also been proposed to form the glass batch into small billets or briquettes comprising all of the batch ingredients cemented together by a binder. This has been accomplished by adding to the mixture of sand and fluxes of the batch a suitable bonding agent, such as, a solution of sodium silicate in small percentage, and mechanically shaping the mixture into the desired units, for example, by molding the mass while it is still plastic, upon a conventional briquetting machine. The briquetting operation required the use of relatively expensive bonding agents and the use of rather expensive machinery. Moreover, the briquettes were all of a single size, which for purpose of economy, were comparatively large and not always of a shape best adapted for feeding operations.

The present invention involves, as a feature, the discovery that conventional glass batch material including sand of the particle size commonly employed in glass batch, for example, approximately 30 to 80 mesh per inch can, if mixed with a small amount of finely pulverized material and water, be formed merely by the bonding action of water and soluble fluxes into small agglomerates of rounded pebble like shaped and assorted sizes, eminently suited for use in glass furnace by a simple tumbling operation.

It involves, as a further feature, the discovery that batches comprising fluxes and ordinary batch sand to which a small amount of fines and a little water have been added can be briquetted without addition of special binders.

Fines suitable for incorporation into the glass batch include various purverized materials, or mixtures of materials, such as: potters-flint, aplite, slag, glass, lime, limestone, quick lime, magnesium carbonate, feldspar, clay, etc. Very good results may, also, be obtained by addition of an amount of 5 to 60 per cent of a finely divided mixture of silica and glass obtained from the grinding or surfacing of plate glass with sand as an abrasive. This material is so fine that nearly all of it will pass a screen of 325 mesh and it usually contains about 12 to 25 per cent of glass. In most instances, 5 per cent of fines based upon the total solids content of the batch, appears to be at or near the minimum, for good nodulation. Even better results are obtained if the fines content is increased to 20 per cent. It may also be increased to 50 per cent, or more. Powdered glass as fines in the mixture, may be employed in lower percentages because the glass in the fine state seems in some manner to react with the soda ash of the batch to produce a chemical set, which more effectively binds the particles of coarser material together. A pronounced chemical set seems to be produced between the powdered glass and the soda ash of the batch even when the powdered glass content is as low as 5 per cent based upon the solids content. In general, however, better results are obtained by use of glass in the ratio of 10 or 15 per cent.

The particle size preferably is such, that the fines will pass through a screen of about 200 mesh. Of course, it is not necessary that all of the material added as fines be of this size. Some of it may be coarser, indeed, of practically any size in reason, but in any event the total amount of fines should approximate 10 per cent or more. There is apparently no lower limit to the particle size except that which is economical to produce.

The desired result may be attained by adding ground silica, ground glass, or other fines to sand, but it may also be obtained by subjecting all or a substantial proportion of the sand or other insoluble ingredients of the batch to a grinding operation until a desired proportion is reduced to fines.

The fluxes of the batch may constitute the binders for the silica and the other granular or pulverulent constituents of the batch. Soda ash, salt cake, boric acid and borax constitute examples of such materials. They are used in normal batch ratio. Hydrated lime and quick lime constitute other examples. These are soluble only to a limited extent, so that, they may combine the functions of a soluble binder and fines materials.

Soda ash undergoes a chemical set in silica mixtures containing pulverized glass, apparently because of interaction of some type. As a result of this set, the nodulated product after drying, is found to have a mechanical strength five to ten times that of the product obtained by nodulation of silica and inert fines with the same binder. Where the material is fed directly to the tank or pot, such strength may not be required. However, if the nodulated material is to be stored in bins or silos the increased strength materially reduces crushing and pulverization of the nodules.

Chemical set effects may, likewise, be obtained by addition of borax or boric acid to a batch containing lime or magnesium carbonate as fines, or by addition of plaster of Paris, Portland cement, chlorides, magnesium salts or the like to the batch.

Chemical set will result from use of quick lime or hydrated lime and finely divided silica or glass. These tend to react together chemically. The lime further absorbs carbon dioxide from the air to effect a bonding action.

If the product is to be nodulated, the percentage of moisture added to dissolve or partially dissolve the fluxes must be controlled with care. This control can readily be obtained by mere observation of the product after the nodulation operation. In general, the amount of water will be within a range of about 15 to 20 per cent, depending somewhat upon the amount of soluble fluxes in the batch. The greater the proportion of fines, therefore, the greater the specific surface of the batch the larger will be the requirements of water for satisfactory nodulation. Slight heat, for example, 150° F. will increase the apparent wetness of the soluble fluxes and will permit operation with slightly less water. It will, also, promote chemical set.

The various ingredients including the water, may be mixed together in apparatus such as: a tumbling barrel, but especially good results are obtained by mulling them in a so-called edge-runner mill. By this method, quick and uniform distribution of water is obtained. Subsequently, nodulation is effected by tumbling the moistened mixture in a convenient manner. A tumbling barrel or rotary kiln constitute a convenient embodiment of apparatus. Heat may be supplied, while the nodulated material is still being tumbled, in order to evaporate excess moisture. If the material is thoroughly disintegrated to obviate lumps at the start of the tumbling operation, it is possible to obtain nodules of small but almost uniform size, which may sometimes be preferred. Disintegration, by passing the material through some form of disintegrator, is contemplated. Small, partially dried nodules of uniform size may be added to a moist batch undergoing nodulation to provide a predetermined number of nodules that tend to build up to form large nodules of uniform size. It may even be effected by tumbling the moist material down a suitable chute.

The nodules obtained by the foregoing operation may be of assorted sizes ranging from approximately that of shot peas or beans up to that of large marbles and occasionally even larger sizes. These assorted sizes are particularly advantageous for feeding and storage because the smaller sizes tend to fill the voids between the larger size, thus, reducing bulk.

The drying operation for eliminating excess water may be conduced in many different ways. Much of it may be taken up in the chemical setting or crystallization of the soluble fluxes. The remainder, or such proportions of the remainder, as is required may be evaporated in the rotary kiln employed in the nodulation operation, or the material may be conducted on suitable conveyors through drying rooms or other convenient forms of dryers.

The finished nodules vary in hardness depending upon the binders or fluxes employed and the character of the fines added to the silica. Each nodule is, and remains, substantially identical in composition throughout, and is identical with every other nodule in the batch. The fluxes are in very intimate contact with the particles of silica. This uniform material, when added to the melt in a glass tank or when subjected to a melting operation in a pot, melts down more readily than a conventional batch and does not liberate any substantial amount of dust to clog the flues and other channels in the furnace. Also, as previously indicated, the melt is of a high degree of uniformity, so that, a superior grade of product is obtained and formed.

For purposes of illustrating the effects of the addition of fines to ordinary batch sand, in order to obtain the nodulation of the latter with a soluble flux such as soda ash, mixtures of the following compositions were prepared.

Table A

| Composition | Result |
|---|---|
| 39% potter's flint (fines)<br>39% batch sand<br>22% soda ash (soluble flux) | Good nodules. The nodules were hard and strong. Center softer than shell. |
| 19.5% potter's flint (fines)<br>58.5% batch sand<br>22% soda ash (soluble flux) | Good nodules. |
| 10% potter's flint (fines)<br>68% batch sand<br>22% soda ash (soluble flux) | Fair nodules. These nodules were quite weak and could readily be crushed between the thumb and forefinger. |
| 78% batch sand<br>22% soda ash (soluble flux)<br>0% potter's flint (fines) | Poor nodules, tended to be granules rather than nodules. Easily crushed. |

It will be noted that in the presence of substantial amounts of fines (potter's flint) in batch sand, nodulation was obtained. However, a similar batch, when the fines were omitted, practically no nodulation was obtained and those nodules produced were so fragile as to be of practically no value.

The effect of glass fines upon the coherence and strength is shown by the following table, which include simplified batches from which ingredients other than; sand, fines and soluble fluxes have been omitted.

Table B

| Contents | I | Modulus | II | Modulus |
|---|---|---|---|---|
| | Per cent | | Per cent | |
| Potter's flint | 39 | | 34 | |
| Batch sand | 39 | 412 | 39 | 550 |
| Soda ash | 22 | | 22 | |
| Glass | | | 5 | |
| Potter's flint | 19.5 | | 14.5 | |
| Batch sand | 58.5 | 183 | 58.5 | 266 |
| Soda ash | 22 | | 22 | |
| Glass | | | 5 | |

In the table the data in column I are percentages in compositions free of glass. In column II, 5 per cent of the inert fines (potter's flint) is replaced by powdered glass. The data in the columns indicated as "modulus" are break strengths of the materials in pounds per square inch.

In the foregoing batches approximately 15 to 20 per cent of water, dependent upon requirement to obtain nodulation, was added. The nodules were obtained by tumbling the material in a rotary kiln. The nodules were then dried in conventional manner before they were ready for use.

The following constitutes an example of a low alkali glass batch which may be employed in the practice of the invention.

Table C

| | Parts by weight |
|---|---|
| Sand | 1,000 |
| Boric acid | 900 |
| Magnesite (powdered) | 400 |
| Feldspar | 375 |
| Flourspar | 140 |

In the foregoing example the sand is employed in combination with the magnesite in powdered form. For example, 200 mesh or less, constitutes the fines. The sand may also, in part, be crushed to provide additional fines.

A glass of the type employed in the manufacture of containers may be of the following composition.

Table D

| | Parts by weight |
|---|---|
| Sand | 1,000 |
| Soda ash | 415 |
| Dolomite (powdered) | 245 |
| Feldspar (powdered) | 100 |
| Saltcake | 12 |
| Niter | 3 |
| Arsenic | 1 |

In each of the latter two examples enough water was added to insure a mixture that would nodulate in a rotary drum dryer, or the like.

The nodulated batch materials above described could easily be added to a tank or pot and melted down to form fluid glass. In fact, melting was substantially more rapid and occurred at a lower temperature than where regular batch materials were employed.

For purposes of economy it is usually desirable to avoid the use of binders other than the soluble fluxes of the batch in the preparation of a nodulizable mix. However, in some instances, it may be desirable to add a separate binder, which may be, but not necessarily a flux. Such substances include bentonite, molasses, sodium silicate, clay and the like. Clay provides a cheap source of alumina, but heretofore has not been used because of difficulty in getting it distributed in the batch. When it is used as a binder, or as fines, or as a combination of the two in a nodulizable mixture, excellent distribution is easily obtained.

The invention is of particular value in the preparation of glass batch materials in the form of nodular or pebble like units obtained by subjecting the glass batch material to a tumbling operation. However, the addition of fines, for example, materials of particle size of 200 mesh or less may be employed in the formulation of briquetted batch in which the soluble fluxes are the sole binder. In such process ordinary sand of the grade employed in the preparation of glass batch may be incorporated with fines in a ratio of 5 per cent or more, and then, further combined with fluxes, such as, lime, soda ash, boric acid or borax or the like to obtain a mixture which when incorporated with about 8 per cent of water can be molded, extruded or rolled, or vibrated into coherent masses that set chemically or dry by evaporation into a firm and relatively strong state adapting the material for use as feed for a glass tank or pot. Without the presence of fines it is impossible to obtain briquettes without the addition of extraneous binders, such as, sodium silicate, molasses or the like. The elimination of such binders, of course, substantially cheapens the process.

Fines may be employed in substantially any ratio from about 5 to 60 per cent, or even more, and particularly satisfactory results are obtained by use of fines in the ratio of about 15 to 20 per cent. Various materials admissible in a glass batch may be employed as a source of fines. Silica or sand ground to a particle size of 200 mesh or less, or spent sand from glass grinding constitutes sources. Finely ground or pulverized glass constitutes another. Glass is of particular value, because as already indicated, when it is admixed with soda ash, it undergoes chemical set to produce briquettes or other mechanically formed bodies of hardness and strength almost approaching that of concrete. Another feature of great importance in connection with this chemical set or hardening, consists in the fact that the briquetted batch is almost perfectly uniform in texture throughout the body. In contradistinction in material which does not tend to set chemically the soluble fluxes may migrate toward the surface of the units as drying progresses, thus forming bodies having a shell of fairly strong and dense composition and cores in porous, friable condition. Other combinations of fines and soluble fluxes which exhibit chemical set include boric acid or borax in combination with lime. These are of particular value in the formation of certain types of glass batch. Partially soluble calcium compounds, such as, calcium oxide or hydroxide, also, exhibit chemical set. In batch compositions containing these substances the hardening may occur by absorption of carbon dioxide from the atmosphere. Hardening may be hastened by exposing the bodies in trays or on moving conveyors to flue gas, or another gas rich in carbon dioxide.

What I claim is:

1. A process of forming pebble like nodules of glass batch materials comprising ordinary glass batch sand and soluble fluxes, which process comprises incorporating with the glass batch materials a substantial amount of finely powdered insoluble material, then incorporating with the mixture a sufficient amount of water to obtain a coherently wet mix and subjecting the mix to a tumbling operation and finally drying the resultant nodules of batch material.

2. A process as defined in claim 1 in which the fines added to the sand of the glass batch are of a particle size of about 200 mesh and less.

3. A process as defined in claim 1 in which the added fines are of a particle size of 200 mesh and less and are employed in a ratio of at least 5 per cent based upon total solids content of the batch.

4. A process as defined in claim 1 in which the fines are of particle size to pass through a screen of 200 mesh and are in a proportion of 10 per cent, at least of the total batch, the ratio of water being within a range of about 15 to 20 per cent.

5. A process of preparing a pebble like nodulated glass batch suitable for melting in a pot or tank to form liquid glass, which process comprises the addition to sand containing the water soluble fluxes of a glass batch, and other batch ingredients, about 5 to 10 per cent of glass crushed to pass a screen of 200 mesh and about 10 to 20 per cent of water based upon the total solids content of the batch and nodulating the resultant mixture by a tumbling operation.

6. A process of forming firm, coherent units of glass batch of relatively uniform composition throughout, which process comprises mixing ordinary batch sand with fluxes which are at least partially water soluble, relatively insoluble fines and a small amount of water, to provide a damp mass, then forming the mixture into the units and eliminating free water from the mixture.

7. A process as defined in claim 6 in which the moist material is formed into briquettes like units by pressing it in molds of suitable shape.

8. A process as defined in claim 1 in which the material is formed into units while slightly heated.

9. A process as defined in claim 1 in which the moistened material is subjected to disintegration before it is nodulated.

10. A process as defined in claim 1 in which nodulation is effected in the presence of a small amount of clay as fines.

11. A process as defined in claim 6 in which mild heat is applied to the moist material in order to increase fluidity of the solution formed by the water and the water soluble fluxes.

12. A process as defined in claim 1 in which the fines employed, interact with the normal water soluble batch ingredients to provide a chemical set.

13. A process of forming glass batch containing a substantial amount of ordinary sand, into nodules, which process comprises admixing a substantial amount of relatively water insoluble fines together with an agent capable of acting with water, first to form a semi-plastic mass, then to set as a solid binder, with about 15 to 20 percent of water, tumbling the moist mixture to form pebble-like nodules and drying the nodules.

GEORGE J. BAIR.